United States Patent Office.

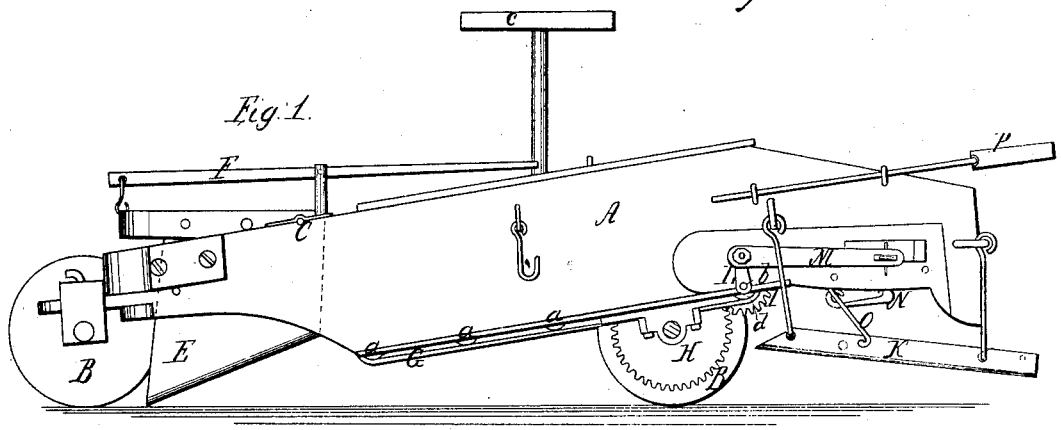
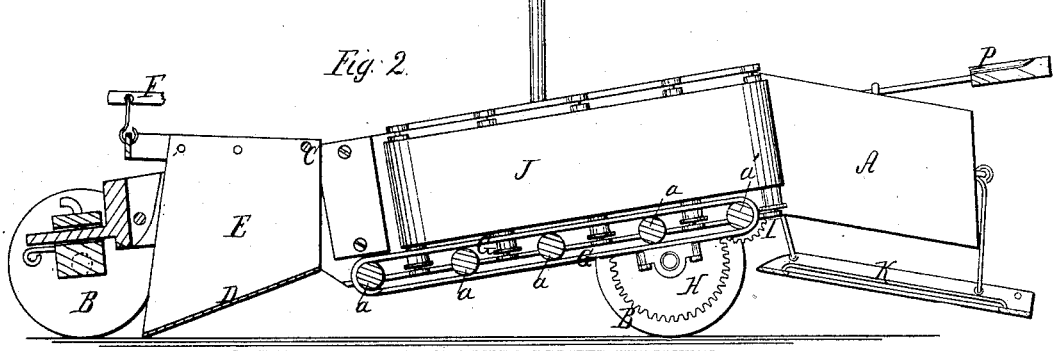
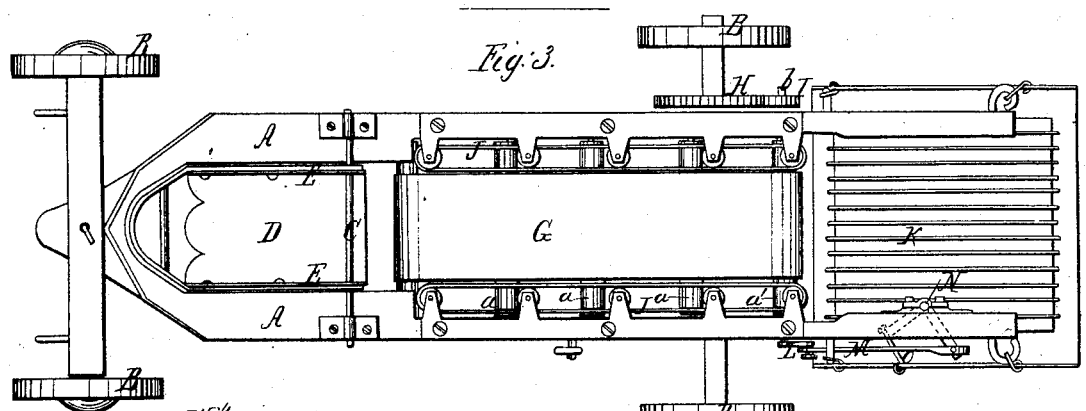

BENJAMIN P. WRIGHT, OF SAN FRANCISCO, CALIFORNIA.

Letters Patent No. 76,371, dated April 7, 1868.

IMPROVEMENT IN POTATO-DIGGERS.

*The Schedule referred to in these Letters Patent and making part of the same.*

TO ALL WHOM IT MAY CONCERN:

Be it known that I, BENJAMIN P. WRIGHT, of the city and county of San Francisco, State of California, have invented an Improved Potato-Digger; and I do hereby declare the following description and accompanying drawings are sufficient to enable any person skilled in the art or science to which it most nearly appertains to make and use my said invention or improvement without further invention or experiment.

The nature of my invention is to construct an improved potato-digger, which shall take the potatoes from the ground, free them from dirt, and finally deposit them in any receptacle prepared for them. This is accomplished by constructing a frame mounted on wheels, and carrying in front a movable spade or digger, which takes the potatoes from the ground, and deposits them upon a carrying-belt, by which they are taken to the rear of the machine, and discharged upon a shaking-sieve or perforated table, where they are freed from the dirt, which falls through the sieve upon the ground, while the potatoes are carried to the back part, and either allowed to fall upon the ground, or they may pass into any desired receptacle.

To more fully illustrate my invention, reference is had to the accompanying drawings, forming a part of this specification, of which—

Figure 1 is a side elevation of my machine.

Figure 2 is a side sectional elevation, showing the digger and the carrying-belt.

Figure 3 is a plan, with seats removed.

Similar letters of reference in each of the figures indicate like parts.

A is a strong frame of wood, mounted upon the wheels B B, and intended to be drawn by horses. A stout bar or shaft, C, passes through the upper part of the frame, as shown, and supports the upper back end of the digger or spade, which consists of a bottom, D, and the sides, E. The bottom, D, is inclined considerably, so as to enter the earth readily, and also discharge upon the belt, and has its front or cutting-edge either plain or serrated, as may be preferred.

A lever, F, is connected to the upper front part of the spade, and extends back to near the driver's seat C, so that the spade may be easily lifted free from the earth, and by means of which the depth of the cut may be easily regulated.

An inclined carrying-belt, G, is supported by the rollers $a\ a\ a\ a'$, and is moved by the gear H upon the rear bearing-axle, and the pinion I upon the axle $b$ of the roller $a'$. The perpendicular side-belts J J serve to keep the load upon the belt G from falling of at the sides.

The lower end of the belt G receives the potatoes and earth as they pass over the back end of the spade, and they are thus carried up, and discharged at the rear end of the belt, upon the inclined sieve or table K. This sieve has a shaking motion imparted to it by the crank L on the axle $b$, the connecting-rod M, the bent lever N, and the rod O, and by this motion the potatoes are freed from the loose earth, which drops through the sieve, while the cleaned potatoes pass back down the inclination until they are received in sacks; or they may fall upon the ground, and be gathered afterwards. A seat is placed at P, which may be used by a boy, to clear the sieve in case of its clogging.

Having thus described my invention, what I claim as new, and desire to secure by Letters Patent, is—

A potato-digger, having the spade D E, the inclined carrying or elevating-belt G, and the belts J J, together with the cleaning-sieve K, the whole constructed and operating substantially as and for the purposes herein described.

In witness whereof, I have hereunto set my hand and seal.

BENJAMIN P. WRIGHT. [L. S.]

Witnesses:
  GEO. H. STRONG,
  C. W. M. SMITH.